C. I. HALL.
MAXIMUM DEMAND RECORDER.
APPLICATION FILED JUNE 18, 1913.

1,217,301.

Patented Feb. 27, 1917.
3 SHEETS—SHEET 1.

Witnesses:
Robt. F. Bracki
August H. Arndt

Inventor
Chester I. Hall
By Brown, Williams, Bell, Hanson & Boettche
Attorneys

C. I. HALL.
MAXIMUM DEMAND RECORDER.
APPLICATION FILED JUNE 18, 1913.

1,217,301.

Patented Feb. 27, 1917.
3 SHEETS—SHEET 2.

Witnesses:
Robert F. Bracke
August H. Arndt

Inventor
Chester I. Hall
By Brown, Williams, Bell, Hanson & Botteller
Attorneys

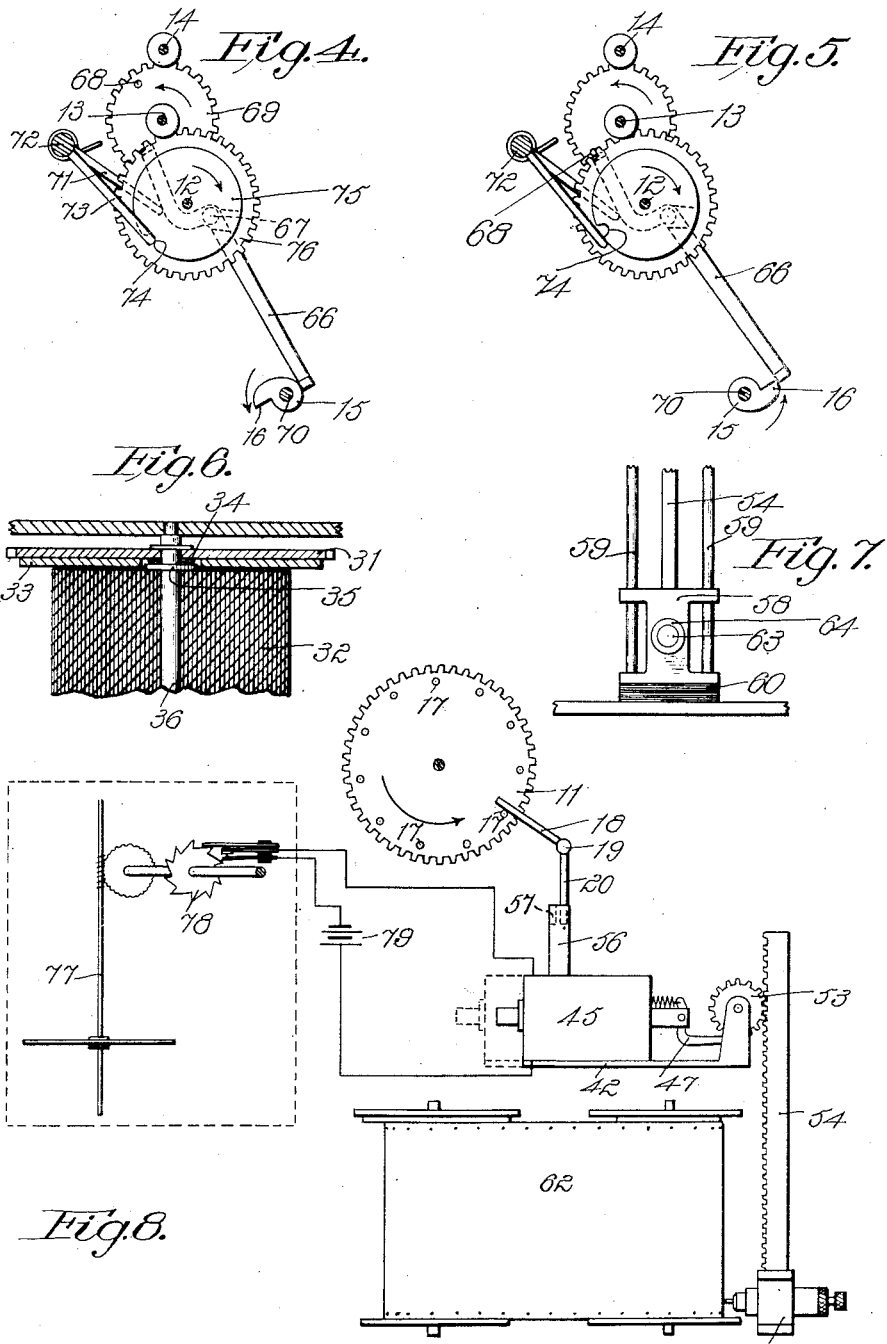

UNITED STATES PATENT OFFICE.

CHESTER I. HALL, OF CHICAGO, ILLINOIS, ASSIGNOR TO CHICAGO ELECTRIC METER COMPANY, OF CHICAGO, ILLINOIS, A CORPORATION OF ILLINOIS.

MAXIMUM-DEMAND RECORDER.

1,217,301. Specification of Letters Patent. Patented Feb. 27, 1917.

Application filed June 18, 1913. Serial No. 774,291.

*To all whom it may concern:*

Be it known that I, CHESTER I. HALL, a citizen of the United States, residing at Chicago, in the county of Cook and State of Illinois, have invented certain new and useful Improvements in Maximum-Demand Recorders, of which the following is a full, clear, concise, and exact description, reference being had to the accompanying drawings, forming a part of this specification.

My invention relates to an improved form of electricity measuring instrument in which a graphical record of the electric energy or current flowing through a circuit is recorded upon a record-sheet in such a manner that the quantity of electricity or current flowing through the circuit in each of successive time intervals is accurately represented upon the record-sheet and, further, that the length of time is clearly indicated during which the consumption of current or energy in the circuit has various maxima values. In other words, the record made by the instrument shows, not only the maximum consumption of current or energy for any one of equal intervals, but it also shows the time distribution of consumption during the interval so that, from the record made, it can be determined in what manner the current was used by the customer during the time of the making of the record. The instrument is also constructed so that if, for any reason, the marking device does not return to zero at the end of each interval, this fact is at once indicated upon the record and the accuracy of the readings is in no way interfered with.

By my invention, the above objects are secured by a construction which is simple, positive in operation, and so constructed that all fine adjustments are eliminated and, as a result, the record produced is reliable and as accurate as a graphic record can readily be made.

The several drawings illustrating my invention are as follows:

Fig. 4 is a vertical sectional view of the parts shown in Fig. 2, taken along the line 4—4;

Fig. 5 shows in a view similar to Fig. 4 the timing devices in their alternate position;

Fig. 6 is a vertical sectional view taken along the line 6—6 in Fig. 1 through the center of the supporting shaft for the receiving roll for the completed record;

Fig. 7 is a view in elevation from the right-hand side of the marking element shown in Fig. 1; and Fig. 8 is a diagrammatic view showing the circuit connections employed so that the instrument may be operated by an electricity meter.

Similar numerals refer to similar parts throughout the several views.

Figure 1:
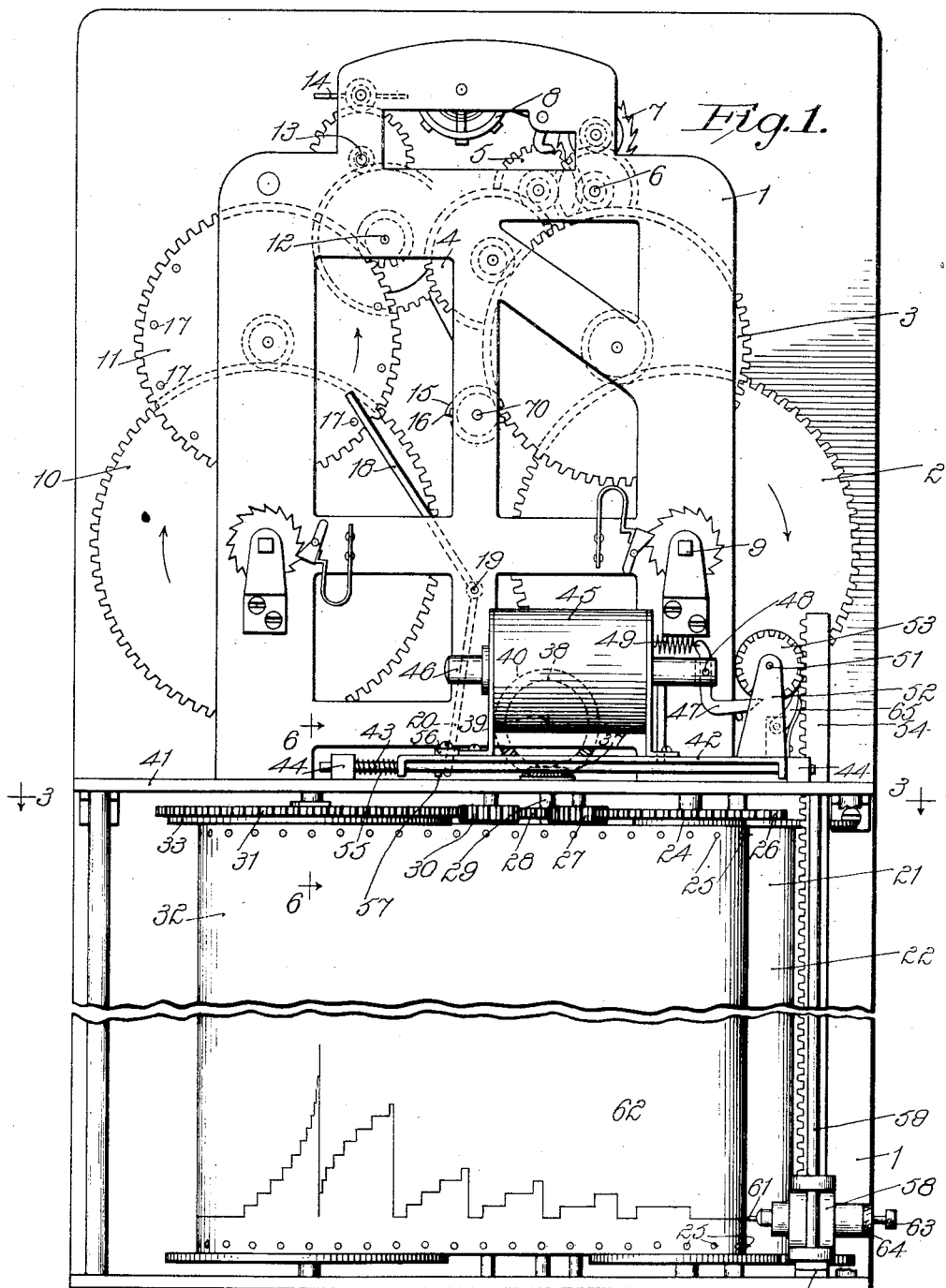
Figure 1 shows in elevation the entire metering mechanism.
Figure 2:
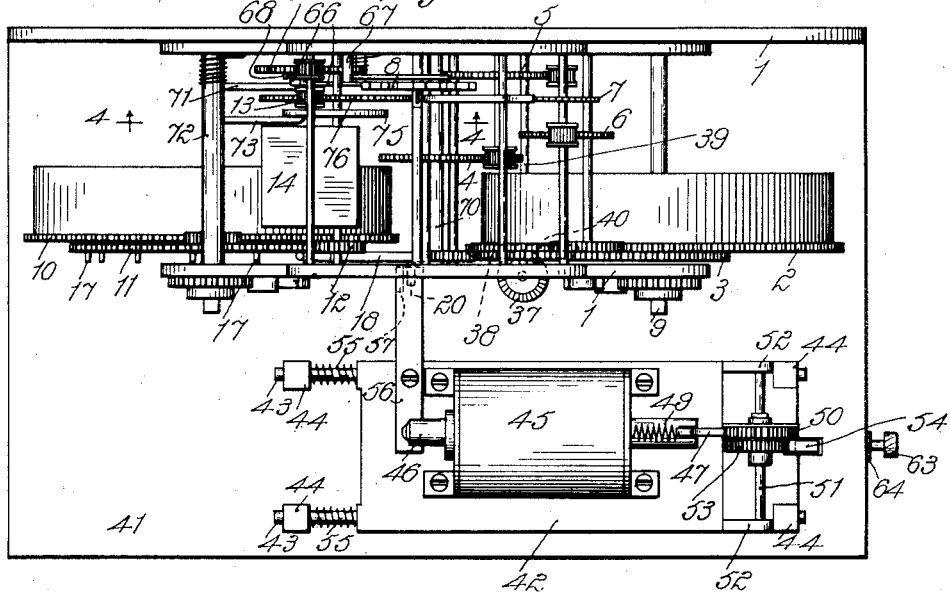
Fig. 2 is a top view of the mechanism shown in Fig. 1.
Figure 3:
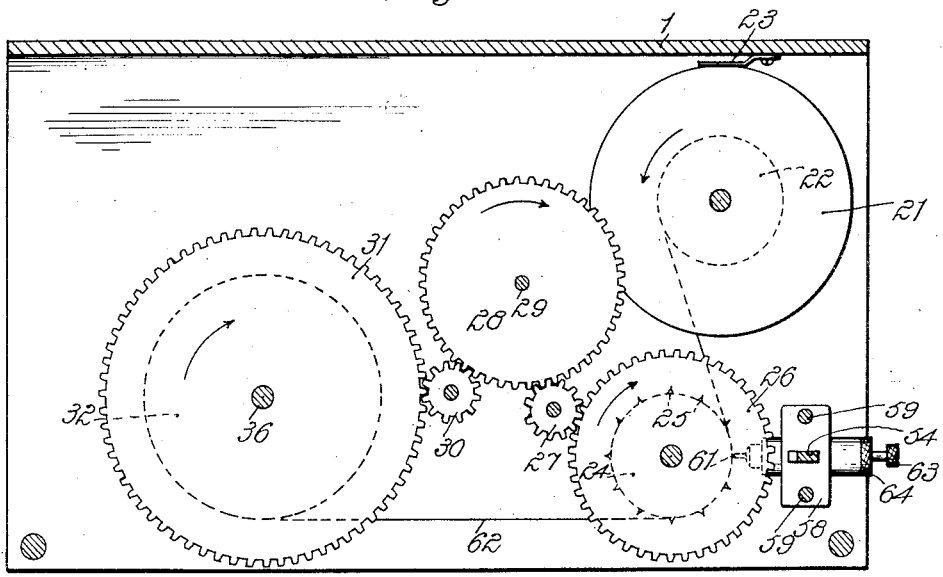
Fig. 3 is a horizontal sectional view of the parts shown in Fig. 1, taken along the line 3—3.

As shown in Figs. 1, 2 and 3, the instrument consists of a framework 1 in which a time train of clockwork mechanism 2, 3, 4, 5, 6, 7, 8 is mounted. This train is adapted to be wound by rotation of the squared arbor 9 in a manner well-known in the art. The other side of the framework 1 has mounted therein a modified striking train 10, 11, 12, 13, 14, for controlling the making of the record. A cam 15 driven by the wheel 3 of the timing chain is provided to release the striking train at regularly recurring intervals in a manner well-known in the art and, in the particular construction shown, the cam 15 has but one projection, as indicated at 16, so that with this arrangement the striking train is released once each hour. If, however, it is desired to have shorter time intervals as the successive intervals during which successive records are made upon the record sheet, the cam 15 will be provided with a corresponding larger number of cam projections 16.

The wheel 11 of the striking train is provided with a plurality of outwardly projecting pins 17 which engage the upper end of a lever 18, pivotally mounted at 19, in the framework, the lower end 20 of which lever operates to restore the marking apparatus to zero at the end of succeeding time intervals in a manner to be described. The striking train is wound in a manner similar to that referred to for the timing train.

The recording apparatus consists of a supply roller 21 mounted vertically in the lower portion of the framework 1 for receiving a supply roll 22 of the record sheet or strip, and this roller 21 has resting upon the surface of one of its flanges a light spring 23, which serves as a brake to prevent rotation of the roller 21 except as it is actuated by pulling the paper from it. A measuring roller 24 is employed, which has projecting axially from it at its top and bottom a series of driving points 25 for accurately feeding the record strip. The roller 24 has secured to its upper end a gear 26 meshing with an idle spur gear 27, which is driven by a gear 28 secured to the vertical shaft 29. The gear 28 also meshes with a second idle pinion 30 which drives a gear 31 secured to the upper end of the receiving roller 32 vertically mounted in the lower left-hand portion of the framework 1. To compensate for varying diameters of the record strip upon the receiving roller 32, a driving friction is mounted in the upper head of the receiving roller, as shown in Fig. 6, in which the upper head 33 of the receiving roller 32 has formed in it a central recess for receiving a flat spring 34, which bears against the undersurface of the gear 31 and also upon the flange 35 rigidly secured to the vertical shaft 36 supporting the receiving roller. The gear 31 and the upper head 33 of the receiving roller are free to revolve upon the shaft 36, as a result of which the driving torque imparted to the receiving roller is only that communicated through the friction spring 34. By this means, as the gearing is so designed as to rotate the roller 32 rapidly enough to wind up the paper when the diameter of the record strip upon the roller is small, the record strip will be maintained at all times in taut condition around the measuring roller 24. Furthermore, as the measuring roller 24 is the sole means for determining the rate of the motion of the record strip, it follows that the strip will at all times be moved equal intervals in equal periods of time.

The shaft 29 has secured to its upper end a beveled gear 37, meshing with a similar beveled gear 38, secured to the shaft 39, which also carries a gear 40 meshing with the gear 2 of the clock train by which the beveled gears referred to and the measuring roller 24 are accurately driven.

As shown more clearly in Fig. 2, the plate 41 forming the top of the lower portion of the frame work is considerably deeper from front to rear than is the clockwork mechanism, and the portion of this plate in front of the clockwork mechanism constitutes a shelf upon which the controlling devices for moving the marking point upon the record are located. These consist of a carriage 42 mounted so as to move freely upon the two horizontal rods 43 supported by posts 44 above the plate 41, transversely of the instrument. The carriage 42 has mounted upon it a solenoid 45 provided with a core or plunger 46, to the right end of which an actuating pawl 47 is pivoted at 48. A spring 49 serves to maintain the pawl in engagement with a ratchet wheel 50 secured to a shaft 51 mounted in upwardly extending bearings 52, 52, carried by the carriage 42. The ratchet wheel 50 has secured to it a spur gear 53, which is in engagement normally with the teeth of a vertical rack 54, and the carriage and parts carried thereby are normally held in their right-hand position so that the gear 53 engages the rack 54 by means of springs 55 surrounding the rods 43 between the left-hand posts 44 and the right-hand end of the carriage 42. The carriage 42 is arranged to move very freely upon the rods 43 and thus, although the springs 55 are comparatively light, the motion of the carriage 42 upon the rods 43 is positive. The carriage 42 has secured to it and projecting toward the back of the instrument an arm 56, having a downwardly extending lug 57 at its left-hand end in line with the lower end of the lower portion 20 of the lever operated by the striking train. As a result of this construction, whenever the striking train is operated, the lever arms 18, 20 by their motion move the carriage 42 and parts carried thereby to the left, entirely clearing the rack 54 from its operating gear and retaining devices so that it is free to fall, together with the marking element 58 secured to its lower end, into its lowermost position.

The rack 54 extends loosely through an opening in the plate 41 made to receive it and the lower end of the rack is secured to the marking element 58, which moves vertically upon the two vertical rods 59, as best indicated in Fig. 7. The fit of the marking element 58 upon the rods 59 is sufficiently loose so that the marking element drops readily to its lowermost position when the rack 54 is released. Resilient material 60 is preferably provided between the bottom plate of the framework and the marking element so as to cushion its fall from any position to which it may be actuated when the rack 54 is released. The marking element 58 carries a marking point 61, which is held in engagement with the record sheet 62 by means of spring pressure controlled by an adjusting screw 63, any particular tension being secured by a lock nut 64. A retaining pawl 65 is mounted upon the carriage 42 to hold the ratchet wheel 50 and the gear 53 in any position to which they may be rotated by the actuating pawl 47. This insures proper engagement between the gear 53 and the rack 54 when the carriage 42 is released by the levers 18, 20.

The devices for controlling the operation of the gear 11 and the levers actuated thereby are shown in Figs. 4 and 5, in which, as indicated, the cam 15 has resting upon it the lower end of a lever 66 pivotally supported at 67 and having its upwardly extending end in the path of the pin 68 carried by the gear 69 when the lever 66 is moved to its outermost position and out of the path of said pin 68 when the lever 66 is in a position nearest the shaft 70 carrying the cam 15. The upper end of the lever 66 has resting against it an arm 71, secured to a shaft 72, from which extends the locking dog 73, the end of which engages a notch 74 formed in a disk 75 secured to the shaft carrying the gear 76. The pin 68 is so disposed angularly relatively to the notch 74 that when the lever 66 is moved outwardly by the cam 15, the dog 73 is moved from engagement with the notch 74, at the same time that the lever 66 is moved into the path of the pin 68 and sufficient motion of the gear train results before the pin 68 engages the lever 66 so that the dog 73 rests upon the outer surface of the disk 75, in which position it remains adjacent to the notch 74 until the lever 66 is released by the cam 15 and moved to the position indicated in Fig. 4 by a suitable spring, for which condition the pin 68 is freed and the gear 76 must make nearly one complete rotation before the dog 73 again engages the notch 74 to prevent further rotation of the gear train. The mechanism described thus affords a definite amount of angular motion of the gear 11 at a rate determined by the fly-wheel 14, so that the carriage 42 may be moved to the left, releasing the rack 54 for a definite time interval sufficient to permit the rack 54 and parts carried thereby to move to their lowermost position, before the rack is again engaged by its actuating gear 53.

In the diagrammatic drawing shown in Fig. 8, the shaft of an integrating electricity meter is indicated at 77 and this shaft drives, by means of the gearing indicated, a ratchet wheel 78, operating contact mechanism of the kind shown and described in my copending application Serial No. 753,257. From this contact mechanism, wires extend to the solenoid 45 and a battery 79, the other terminal of the battery being connected with the other terminal of the solenoid. The relation of the mechanical parts controlled by the actuation of the solenoid and the relation of the marker to the record sheet is clearly indicated in this view and require no special description.

It is to be pointed out that the record sheet is preferably of considerable length so that there is considerable motion of the record sheet during each interval between successive withdrawals of the carriage 42 from the rack 54 to permit the making of a record, which will clearly indicate what occurs during each of the intervals, that is to say, whether the maximum demand indicated by the record for any interval is built up rapidly at one portion of the interval, or whether it is a uniform increase representing a steady rate of consumption of current or energy.

In constructing devices of this kind, it has been found that the mechanical load necessarily imposed upon the electricity meter by the moving pointer, if it be attempted to drive the pointer directly and mechanically from the moving parts of the meter, is so great as to seriously interfere with the accurate operation of the meter. By my invention, therefore, I provide electrical devices for moving the pointer or marker upon the record sheet proportionally to the current or energy integrated by the meter, as a result of which, the record 80, shown in Fig. 1 upon the record sheet, has a step-like conformation, since the pointer is moved upwardly for each successive given amount of current or energy integrated. It will be understood, however, that the devices controlling the actuation of the pointer may be so proportioned that these amounts may have any desired value to meet any particular operating conditions and that, therefore, the steps may be as small as desired and constitute in effect a continuous curve. A further result secured by my invention is that the mechanism used to release the marker at the end of each time interval removes all of the moving parts from engagement with the element rigidly associated with the marker and, as this element is freely supported so as to move without appreciable friction vertically, it is certain to return to its initial position at the end of each interval with great accuracy. It will be understood, however, if for any reason the marker does not completely return to its initial position at the end of any time interval, that, for the next time interval, a new base line is automatically produced by the marker upon the record sheet and that the consumption for the next interval is determined by referring to this new base line and that this may be true for any time interval or intervals depending upon how long the difficulty exists preventing the complete return of the marker or what the nature of the difficulty may be. The return of the marker at the end of each time interval to its zero position is made certain for the further reason that the removal of the actuating devices mounted upon the carriage 42 from engagement with the rack 54 is mechanical and positive, there being at all times ample power to accomplish this result. It will also be observed that the moving parts operated by the current from the source 79 which is to actuate the solenoid 45 are few in number and that the friction upon them is comparatively small and, therefore, the amount of the electrical energy required to move the marker over the record sheet can be made very small and well within the practical requirements made in connection with instruments of this kind. It will at once appear that, if the current were large, the arcing occurring at the terminals of the contacts actuated by the wheel 78 would be prohibitive and the maintenance of the instrument would be so serious a factor as to preclude its installation for practical purposes.

While I have shown the particular form of contact mechanism illustrated in Fig. 8 for controlling the operation of the solenoid 45, it will be understood that I may employ other forms of contact mechanism for accomplishing this result, as for example that shown and described in my copending application, Serial Nos. 600,426 and 612,052.

In some of the appended claims I have used the term "significant" to define the intervals during which electrical energy is consumed and recorded. By a "significant interval" I mean an interval which, while it may be very short as compared to a billing period of, say, one month, is long as compared to the time in which ordinary variations or fluctuations in the electricity supply occur. Thus a record of time elapsed and energy consumed during an interval of a few seconds' duration does not afford any "significant" information upon which a charge may be based, as the interval is so short that the record would be affected by fluctuations and variations in the supply of electrical energy. On the other hand, a record of energy consumed and time elapsed during an interval of, say, ten minutes or one hour is not affected by ordinary fluctuations or variations in the electricity supply, and thus the record for such an interval does afford "significant" information which may be used in arriving at a charge to be made against a consumer of electrical energy.

While I have shown my invention in the particular embodiments before described, it will be understood that I do not limit myself to these exact details as I might use other equivalent constructions without departing from the spirit of my invention.

What I claim is:

1. In an electricity measuring and recording mechanism, the combination of devices for driving a record sheet at a uniform rate, a marker for tracing a record upon the record sheet, an element extending vertically from the marker, mechanism for moving the element and marker vertically proportionally to the electricity measured, and devices for freeing said element from its actuating mechanism at the end of each of regularly recurring significant intervals, the motion of the record sheet during each interval being sufficient to indicate upon the record the distribution of electricity measured during each interval.

2. In an electricity measuring and recording instrument the combination with devices for driving a record sheet at a uniform rate, of a marker, means for advancing said marker in steps transversely of the direction of motion of the record sheet and in contact therewith, mechanism for causing each advance step of said marker to occur when a definite quantity of electricity has been measured, and mechanism for periodically returning said marker to its initial position at one side of the record sheet, the line traced by said marker serving as a graphic indication of the rate at which electricity was consumed during component parts of each of a plurality of successive intervals.

3. In an electricity measuring and recording instrument, the combination with devices for driving a record sheet at a uniform rate, of a marker, electromechanical means for advancing said marker in steps transversely of the direction of motion of the record sheet and in contact therewith, mechanism for causing each advance step of said element to occur when a definite quantity of electricity has been measured, mechanism for returning said marker to its initial position at one edge of the record sheet after each of successive equal time intervals, the line traced by said marker serving as a graphic indication of the quantity of electricity used in successive equal time intervals and the rate at which the electricity was used during component parts of each time interval.

4. In an electricity measuring and recording mechanism, the combination of devices for moving a record sheet at a uniform rate, a marker mounted to move transversely of the motion of the record sheet in contact therewith to make a record thereon, a rack extending from said marker, a gear for actuating said rack, a solenoid for actuating said gear, and a movable carriage for supporting said solenoid and gear, motion of said carriage serving to move the gear from engagement with said rack, said carriage being operated at regular recurring significant intervals.

5. In an electricity measuring and recording mechanism, the combination of devices for moving a record sheet at a uniform rate, a marker mounted to move transversely of the motion of the record sheet to make a continuous record thereon, a rack extending from said marker, a gear for actuating said rack, a solenoid for actuating said gear, a movable carriage for supporting said solenoid and gear, motion of said carriage serving to move the gear from engagement with said rack, and devices for moving said carriage at significant intervals to release the gear from said rack.

6. In an electricity measuring and recording mechanism, the combination of devices for moving a record sheet at a uniform rate, a marker mounted to move transversely of the motion of the record sheet to make a continuous record thereon, a rack extending from said marker, a gear for actuating said rack, a solenoid for actuating said gear, a movable carriage for supporting said solenoid and gear, motion of said carriage serving to move the gear from engagement with said rack, a gear train, mechanism for periodically permitting motion of the gear train, and mechanical devices actuated by the gear train for moving the carriage at significant intervals to move the gear from engagement with said rack.

7. In an electricity measuring and recording mechanism, the combination of devices for moving a record sheet at a uniform rate, a marker mounted to move transversely of the motion of the record sheet to make a continuous record thereon, a rack extending from said marker, a gear for actuating said rack, a solenoid for actuating said gear, a movable carriage for supporting said solenoid and gear, motion of said carriage at significant intervals serving to move the gear from engagement with said rack, electricity integrating mechanism, and connections between said integrating mechanism and said solenoid for operating said solenoid and thereby said marker proportionally to the electricity integrated.

8. In a recording mechanism, the combination of a supply roller for holding a record sheet, a receiving roller for said record sheet, a driving roller for engaging the record sheet between the supply roller and the receiving roller, gearing for driving the driving roller and the receiving roller, friction devices carried by the receiving roller for permitting the gearing connected with it to be driven faster than the receiving roller is rotated, a marker movable in contact with the surface and longitudinally of the driving roller for making a record upon the record sheet, mechanism for driving the gearing at a uniform rate, electricity integrating mechanism, devices for actuating the marker proportionally to the electricity integrated, and means for releasing the marker at significant intervals to permit it to return to its initial position.

9. In an apparatus of the class described the combination with devices for driving a record sheet at a uniform rate, of a marker, means for effecting a step by step advancement of the marker, transversely of the direction of motion of the record sheet and in contact with the latter, each one-step advancement being accomplished when a definite quantity of electricity has been measured, and means for returning the marker to its initial position at one side of the record sheet at recurring intervals, the line traced upon the record sheet by said marker serving as a graphic indication of successive intervals in the consumption of electricity and the rate at which electricity was used during component parts of each interval.

In witness whereof, I hereunto subscribe my name this 12th day of June, A. D. 1913.

CHESTER I. HALL.

Witnesses:
ALBERT G. MCCALEB,
ALBIN C. AHLBERG.